US007644862B2

(12) United States Patent
Rolf (10) Patent No.: US 7,644,862 B2
(45) Date of Patent: Jan. 12, 2010

(54) AFFILIATE MARKETING SYSTEM AND METHOD FOR RETAIL STORES

(75) Inventor: Devon A. Rolf, Paola, KS (US)

(73) Assignee: GoFiniti, LLC, Paola, KS (US)

( * ) Notice: Subject to any disclaimer, the term of this patent is extended or adjusted under 35 U.S.C. 154(b) by 371 days.

(21) Appl. No.: 11/375,822

(22) Filed: Mar. 15, 2006

(65) Prior Publication Data

US 2007/0219872 A1 Sep. 20, 2007

(51) Int. Cl.
G06K 15/00 (2006.01)
G06Q 30/00 (2006.01)

(52) U.S. Cl. ............................. 235/383; 705/26; 705/14
(58) Field of Classification Search ................ 235/383, 235/385; 705/14, 26

See application file for complete search history.

(56) References Cited

U.S. PATENT DOCUMENTS

| | | | |
|---|---|---|---|
| 5,475,833 A | 12/1995 | Dauerer et al. .............. 707/201 |
| 5,537,314 A | 7/1996 | Kanter ........................ 705/14 |
| 5,555,191 A | 9/1996 | Hripcsak ..................... 709/224 |
| 5,712,979 A | 1/1998 | Graber et al. ............... 709/224 |
| 5,717,860 A | 2/1998 | Graber et al. ............... 709/227 |
| 5,812,769 A | 9/1998 | Graber et al. ............... 709/228 |
| 5,819,285 A | 10/1998 | Damico et al. ........... 707/104.1 |
| 5,937,390 A | 8/1999 | Hyodo ........................ 705/14 |
| 5,960,409 A | 9/1999 | Wexler ....................... 705/14 |
| 5,991,740 A | 11/1999 | Messer ........................ 705/27 |
| 6,029,141 A | 2/2000 | Bezos et al. ................. 705/27 |
| 6,049,778 A | 4/2000 | Walker et al. ................ 705/14 |
| 6,092,102 A | 7/2000 | Wagner .................... 340/7.29 |
| 6,115,690 A | 9/2000 | Wong ........................... 705/7 |
| 6,266,654 B1 | 7/2001 | Schull ......................... 705/58 |
| 6,334,111 B1 | 12/2001 | Carrott ....................... 705/14 |
| 6,343,275 B1 | 1/2002 | Wong ......................... 705/26 |
| 6,446,044 B1 | 9/2002 | Luth et al. ................... 705/14 |
| 6,553,403 B1 | 4/2003 | Jarriel et al. ................ 709/202 |
| 6,578,010 B1 | 6/2003 | Teacherson ................. 705/14 |
| 6,658,454 B1 | 12/2003 | Delany et al. ............... 709/202 |
| 6,662,212 B1 | 12/2003 | Chandhok et al. .......... 709/206 |
| 6,947,897 B2 | 9/2005 | Lortscher et al. ............ 705/14 |
| 6,957,220 B2 | 10/2005 | Lamkin et al. ............. 707/100 |
| 6,980,962 B1 | 12/2005 | Arganbright et al. ......... 705/26 |
| 6,993,489 B1 | 1/2006 | Miglautsch .................. 705/1 |
| 7,036,727 B2 * | 5/2006 | Iijima ........................ 235/383 |
| 7,124,115 B1 * | 10/2006 | Herzberg et al. ............ 705/64 |
| 7,403,905 B2 * | 7/2008 | Shioda et al. ................ 705/14 |
| 2003/0023687 A1 * | 1/2003 | Wolfe ........................ 709/206 |

* cited by examiner

*Primary Examiner*—Jamara A Franklin
(74) *Attorney, Agent, or Firm*—Hovey Williams LLP (57) ABSTRACT

A affiliate marketing system and method for retail stores involves assigning a unique retail store identifier to a retail store and presenting the unique retail store identifier and a website address in conjunction with a product offered for sale in the retail store. A purchaser of the product may access the website and make a purchase. By entering the identity of the retail store, such as by entry of the unique retail store identifier or by selecting the retail store from a list, a commission for the purchase is allocated to the retail store.

19 Claims, 5 Drawing Sheets

AFFILIATE MARKETING SYSTEM AND METHOD FOR RETAIL STORES

BACKGROUND OF THE INVENTION

The present invention is generally directed to an affiliate marketing system and method for retail stores. More particularly, the present invention is directed to an affiliate marketing system and method that combines use of a physical retail store and an online website.

Each of online stores on the Internet and physical retail stores has their respective advantages and disadvantages. As examples, online stores may be able offer substantially more products than a physical retail store given space limitations in a physical retail store, while physical retail stores give customers the opportunity to handle a product before purchasing, obtain the product at the time of purchase, and perhaps obtain more personal customer service.

SUMMARY OF THE INVENTION

The present invention is a unique affiliate marketing method that allows physical retail stores to increase their revenue without increasing their inventory, while allowing sources of products to be sold in the retail store (such as manufacturers or wholesalers) to reach more customers and sell more products or services than may be possible simply by supplying products to retail stores. To provide a contextual example of the environment in which the present invention may be employed, consider a retail book and gift store that desires to feature a particular lifestyle or category of product in a section of the store. For example, assume that the gift and book store decided to feature a section on homemaking. As part of the section, the retail store offers books and other content (such as videos, audio, etc.) on homemaking subjects such as cooking, baking, home decorating, home organization, home economics, etc. Perhaps the retail store also offers a handful of homemaking gift products, such as aprons, oven mitts and pot holders, candles, etc. However, because the retail gift and book store is not a housewares store, it does not have the space or perhaps proper knowledge-base to add vast housewares offerings in the section. Similarly, assume that a source of homemaking items provides both books and audio and video content as well as a wide variety of housewares. Ideally for the provider of housewares, it could offer all of its products in the retail store, but that is not possible due to the limitations of the retail store. Also, ideally for the retail store, it could capitalize on customer interest in the homemaking lifestyle category on sales of products that are stimulated by a customer's interest in the lifestyle category as a result of the section in the store or a purchase made at the store. The present invention provides a unique affiliate marketing method and solution that meets this need and, thus, increases commerce and revenue for both the retail store and the source of goods.

In particular, a method of the present invention involves assigning each retail store with a unique identifier and placing that identifier on or in conjunction with products and/or product packaging or materials accompanying the product offered in the retail store. Additionally, a notice or listing of a website URL or domain name is presented on the product, product packaging and/or accompanying materials that directs a purchaser of the product to visit the website and see additional products. Upon accessing the website, the purchaser of the product enters the unique store identifier found with the product (or otherwise selects at the website the retailer at which the product was bought) such that any additional products purchased during that session at that website will be allocated to the retail store and a commission, according to a defined and agreed-up commission structure, will be paid to the retail store for that purchase.

Accordingly, given the exemplary environment above, assume that a book on bread making is offered in the retail book and gift store. In accordance with the invention, a label bearing a unique identifier of the retail store and a website address are provided, preferably along with instructions or an offer to access the website to see additional products. The label or offering may further offer a discount on a purchase at the website to provide additional incentive for the customer to access the site and make a purchase. Assume, however, that the retail book and gift store does not offer bread making appliances, such as bread makers, mixers, or grain mills. Rather, these products are offered by a source associated with the website. A purchaser of the book on breadmaking may, using a communications device such as a personal computer or cellular telephone with browser connected to the Internet, access the website and make purchases at the website. By entering the unique retail store identifier found with the book on bread making, the source associated with the website allocates a commission for a sale at the website back to the retail store that generated the lead.

In one embodiment of the invention, a customer record of the purchaser is stored in a database associated with the source and the customer is permanently associated with the retail store identified by the unique identifier. In this way, subsequent purchases by the customer at the website will also result in commission payments to the retail store even if the customer did not re-enter the unique identifier. Alternatively, the present invention can be programmed so that commissions are paid only on sales during a defined period of time. Alternatively, the invention can be structured such that a commission is paid only once (such as on a first purchase at the website) and/or only on certain products or services.

In an alternate embodiment, three parties are involved. In particular, assume that a first party may is a retail store source, a second party is a provider of goods to the retail store, and a third party is a provider of products or services that relate to the goods provided by the second party. So, to illustrate by way of an example, a retail book and gift store (first source) offers a book on bread making from a second party (second source). A third party (third source) that offers bread making appliances has affiliated with either the first source or the second source (or both) via a contractual arrangement, such that a website address of the third source is provided in conjunction with the book. Additionally, one or more unique identifiers for identifying the first and/or second source are provided with this book. In this way, either the first source or the second source or both receive a commission, according to an agreed-upon commission structure, for one or more purchases made at the website of the third source by a purchaser of the book who has identified at the website either or both of the first and second source.

DETAILED DESCRIPTION OF THE INVENTION

Figure 1:
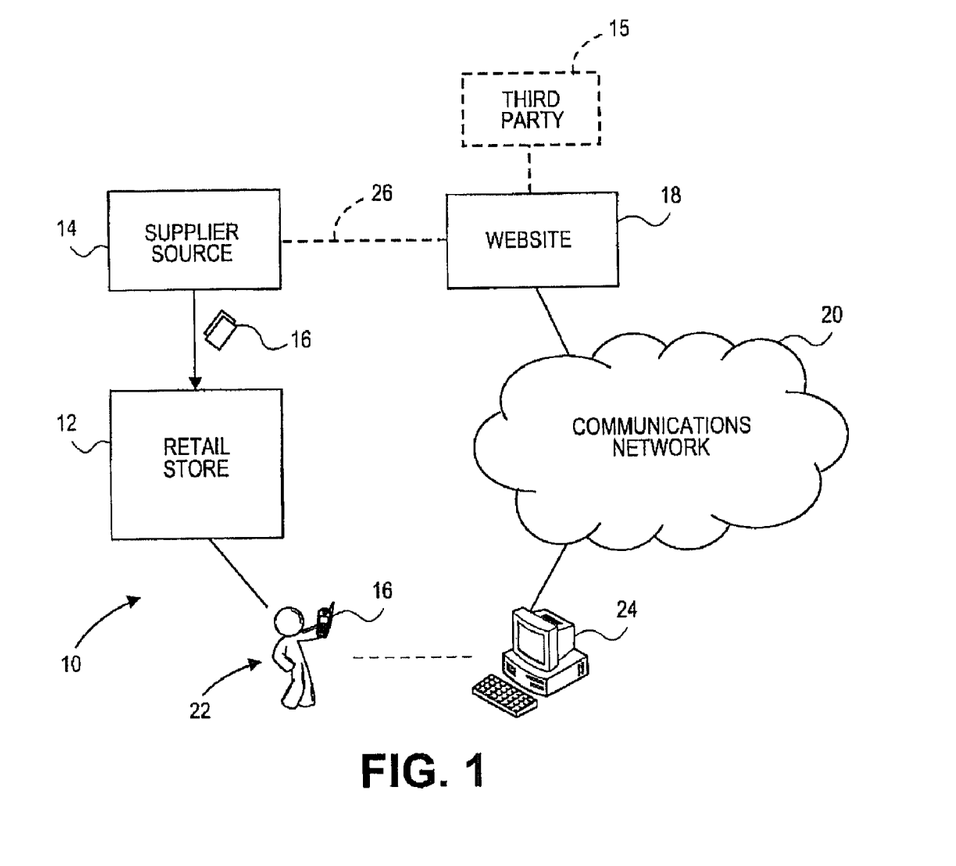
FIG. 1 is a block diagram illustrating for illustrating the operational environment of the present invention.

With reference initially to FIG. 1, an exemplary environment of the present invention which embodies the system and method of the present invention is denoted generally by the reference numeral 10. Reference numeral 12 denotes a conventional retail store of a bricks and mortar or physical nature. Reference numeral 14 references a supplier of a good or goods, such as good 16, to retail store 12. Supplier 14 may be a manufacturer, product design and marketing firm, wholesaler, etc. As illustrated, a website, such as an online store, is denoted by the reference numeral 18. Website 18 is accessible via a communication network 20 from any communications device capable of accessing a global communications network, such as the Internet. Website 18 may be a website associated with the source (supplier) 14, as denoted by dashed line 26. Alternatively, as described herein, website 18 may be a website that is associated with a third party provider of goods online and not with supplier 14. As illustrated, a customer 22 of retail store 12 becomes a purchaser by purchasing the good 16. Customer 22 has a communications device, such as personal computer 24, for accessing the Internet and, in particular, website 18.

Communications devices for accessing website 18 may be of a variety of types including personal computers, such as personal computer 24, laptop computers, mobile wireless devices, including cellular telephones, or other types of communications devices, such as interactive televisions or computing-based media systems connected to a network, voice over IP systems, etc.

Communications network 20 is preferably a global communications network and is intended to encompass any and/or all types of communications networks including wide area networks and local area networks and combinations thereof employing wire, cable, fiber-optic, wireless, and/or other technologies. In particular, communications network 20 may include, without limitation, any form of telecommunications network. Communications network may include, but is not limited to cellular networks, satellite networks, WiFi and/or WiMax hotspots, nodes, and/or networks, etc. It should be understood that communications network 20 may use a wide variety of protocols, including Internet protocols, which is a collection of interconnected networks that are linked together by a set of standard protocols (such as TCP/IP and HTTP) to form a global, distributed network. It should also be understood that the present invention contemplates and covers networks and protocols developed, refined and/or advanced in the future, including but not limited to Internet2, or UCAID (University Corporation for Advanced Internet Development).

In accordance with the invention, retail store 12 offers goods, such as good 16, from supplier source 14. In one embodiment, and in accordance with an affiliate program of the present invention, retail store 12 and supplier source 14 have entered into a unique affiliate agreement that permits customers of retail store 12 to access a website 18 of supplier source 14 and buy additional products, including products not found in retail store 14. By identifying the retail store 12 during such a transaction at website 18, retail store 12 is allocated a commission on the sale at the website according to the agreement between retail store 12 and supplier source 14.

Figure 2:
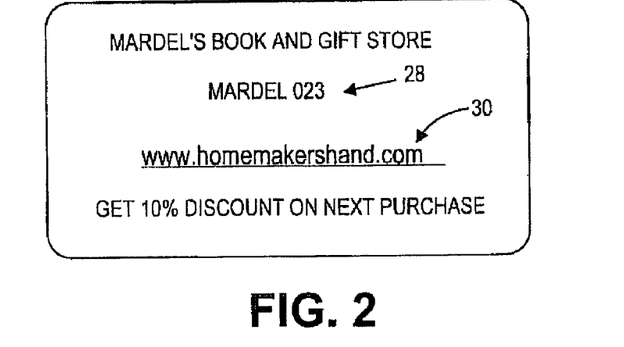
FIG. 2 is an example of subject matter provided with a product, such as on a label, tag or packaging, offered in accordance with the present invention.

With additional reference to FIG. 2, an example of subject matter presented with good 16 is illustrated and described.

FIG. 2 illustrates an example of subject matter that is presented to purchaser 22 when purchaser 22 purchases good 16 from retail source 12. For example, the subject matter may be presented directly on good 16, on a label or tag associated with good 16, on packaging of good 16, on a flyer or bulletin provided to customer 22 at a time of purchase of good 16, on a receipt for a purchase of good 16. In the event the purchase of good 16 is made at retail store 12 with a mobile electronic device, such as a PDA or cell phone, the subject matter may be transmitted electronically to the purchasing device for display on the purchasing device.

In particular, as illustrated in FIG. 2, the subject matter presented to purchaser 22 when purchasing good 16 includes a unique identifier associated with the retail store 12. In the example illustrated, the retail store is named Mardel's Book and Gift Store. The uniquely assigned identifier, denoted by reference numeral 28, is Mardel023, which may, for example, represent the $23^{rd}$ store in a chain of Mardel stores. It will be appreciated that the unique identifier may be any string of letters, numbers and or characters. It should also be appreciated that a retail store chain that owns a number of retail stores may have a common identifier encompassing all stores, although it is preferred that each store in a chain include its own identifier so that affiliate sales can be tracked with greater particularity. The subject matter also includes an electronic address 30, such as in this example a URL www.homemakershand.com, for referencing website 18. Additionally, the subject matter may further include instructions to access website 18. Further, the identifier can be associated with a discount offered by source 14 at website 18 or, alternatively, the subject matter can include an additional coupon code for generating a discount on a purchase or purchases at website 18.

Figure 3:
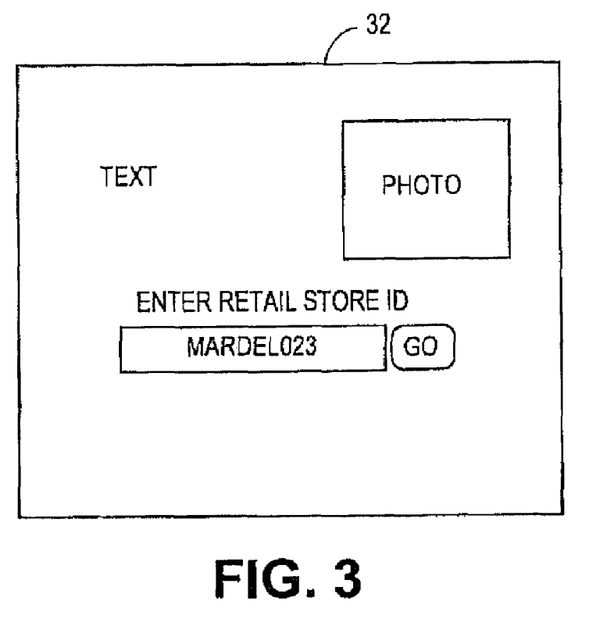
FIG. 3 is an example of a web-page at which information identifying a source is entered.

With additional reference to FIG. 3, a webpage of website 18 is illustrated and described.

Website 18 can be constructed in any conventional manner, and preferably is an online store with shopping cart. As illustrated in FIG. 3, webpage 32 at website 18 prompts purchaser 22 to enter the unique retail store identifier 28 into a provided field or window 34 when making a purchase at website 18. Entry of the identifier associates a purchase at the website 18 with retail store 12 and results in a commission allocation to retail store 12 for the purchase made at website 18. It should be appreciated that that entry of the identifier may be required at any time, such as when purchaser 22 first access website 22 or during entry of identifying information when making a purchase.

Figure 4:
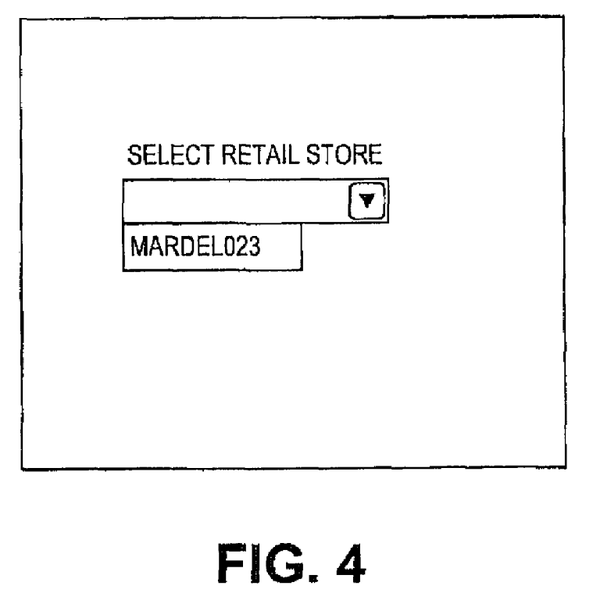
FIG. 4 is an example of a web-page that may be employed in an alternate embodiment of the present invention.

With additional reference to FIG. 4, an alternate embodiment is illustrated and described.

In FIG. 4, a web-page of website 18 is illustrated. In this embodiment, rather than purchaser 22 entering the unique identifier into website 18, the purchaser is prompted to select a retail store from provided list 36. In this embodiment, it will be appreciated, a purchaser may select any retail store, but will preferably select a retail store at which he or she has made a purchase or with which he or she is affiliated.

Figure 5:
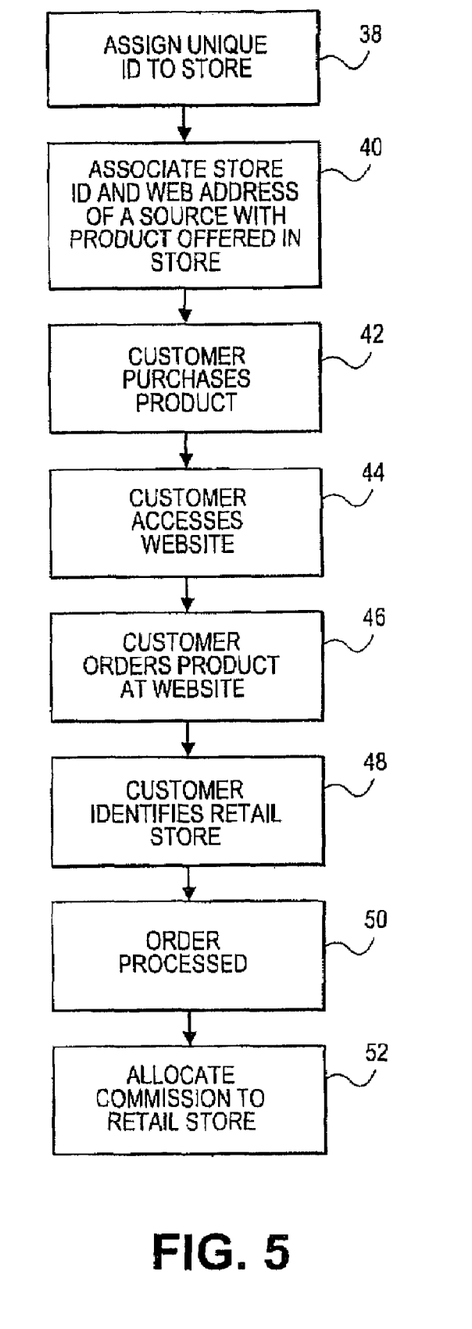
FIG. 5 is a flow-chart depicting operation and/or use of the present invention.

With additional reference to FIG. 5, use and operation of the present invention is illustrated and described.

With reference to FIG. 5, it will be understood that retail store 12 and supplier source 14 have entered into an agreement, such as written affiliate contract. According to the invention, at step 38 a unique identifier is assigned to retail store 12 (or the owner of retail store 12). The assignment of the unique identifier to retail store 12 may be done manually by manual selection of the identifier and operator entry of the identifier into a computer program that embodies the present invention. Alternatively, and preferably, the unique identifier is automatically assigned after setting up the affiliate program and providing certain guiding parameters (such as, perhaps, selecting a first series of letters of the unique identifier to match a name of the retail store 12 or supplier source 14).

At step 40, the unique identifier 28 and a web address 30 of website 18 are associated with a product (such as good 16) to be sold in retail store 12. At step 42, a purchaser 22 purchases good 16 and is presented with the unique identifier and web address of website 18. At step 44, purchaser 22, using a communications device such as personal computer 24, accesses website 18 (such as by typing the URL 30 into a browser field of a browser program and commanding the personal computer to navigate to the entered URL). At step 46, purchaser 22 places an order for one or more goods, services and/or content at website 18. At step 48, the purchaser 22 is prompted to identify the retail store 12 in one of the manners indicated herein (such as by entry of identifier 28 or selection of retail store 12 from list 36). It should be understood that the identifier may be required at any step in the online process, such as when first accessing the website, during a shopping cart step, during a purchase confirmation step, etc. The system and method of the present invention may also be designed (programmed) such that purchases at the website, or a purchase of particular product at the website, or purchases at a particular section of the website, can not be made unless a retailer is identified. At step 50, the order is processed and, as indicated at step 52, a commission is allocated to retail store 12.

It will be understood and appreciated, in view of the foregoing, that a three-party arrangement may be established in which the website 18 is associated with a third party, such as third party 15 depicted in FIG. 1, that is not retail store 12 or supplier source 14. In such an embodiment, either the retail store, the supplier source, or both may receive a commission. In that regard, a unique identifier that identifies both the retail store and the supplier source may be generated as part of the affiliate program. Alternatively, the identifier may identify one of the retail store and the supplier source, with the other being associated by a database entry. Alternatively, two identifiers, one for the retail store and one for the supplier source, may be presented, although this is not preferred. It will also be understood that the website 18 could be have the appearance of being a website of retail store 12, although actually being a website owned and operated by supplier source 14 or a third party.

The present invention includes one or more software modules, stored on computer readable medium and executable in a computer operating environment, used for setting up new affiliate relationships, shopping cart operations, and commission allocation and management.

Figure 6:
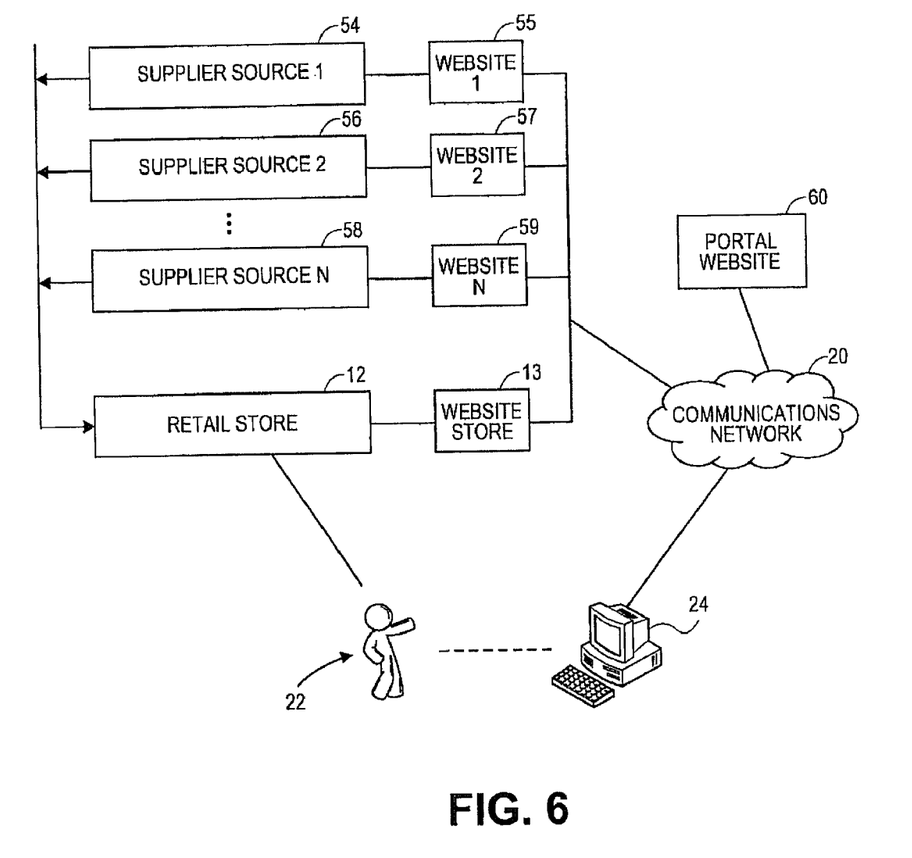
FIG. 6 is a block diagram for illustrating the operational environment of an alternate embodiment of the present invention.

With additional reference to FIG. 6, an alternate embodiment of the invention, involving a portal, is illustrated and described.

In accordance with an aspect of the invention, the affiliate program may be managed by a marketing or management agency or entity. Such a marketing or management agency would provide the software of the invention, assist in establishing the affiliate program, generating the identifiers, etc. As set forth in FIG. 6, the retail store 12 has a number of different supplier sources, namely supplier source 1 depicted by reference numeral 54, supplier source 2 depicted by reference numeral 56, and so on down to supplier source N depicted by reference numeral 58. The marketing/management agency has a portal website 60. In one embodiment of the invention, the portal website includes products (presumably in far greater number and type than are offered at the retail store 12) offered by the supplier sources, such that the supplier sources also supply the entity associated with portal site 60. In this embodiment, a purchaser 22 of a product at retail store 12 is given information about the portal website. When the purchaser 22 accesses portal site 60, he or she is requested (at some point in the process) to identify a retail store, such as retail store 12. A purchase then made at portal site 60 results in a commission allocation to retail store 12. As set forth above, this is preferably accomplished by entry of a retail store identifier.

Figure 7:
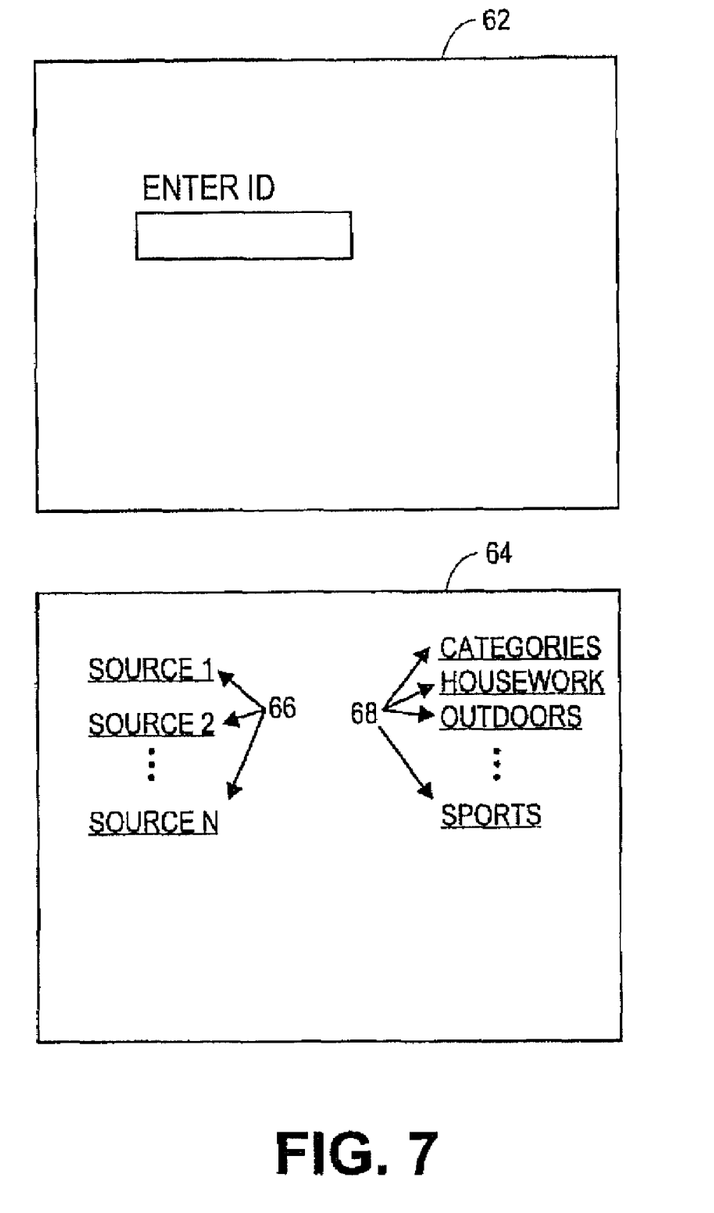
FIG. 7 depicts two webpages according to the alternate embodiment illustrated and described in conjunction with FIG. 6.

In an alternate embodiment, portal site 60 does not itself offer products, but rather provides hyperlinks to websites associated with the supplier sources to retail store 12, as illustrated in FIGS. 6 and 7. FIG. 7 illustrates an example of a webpage 62 at portal site 60 that requests entry of an identifier of the retail store 12. After entry of a retail store identifier, the system of the invention retrieves, from a database, information on the supplier sources for the retail store that are part of the affiliate program. As shown in the example of webpage 64, entry of the retail store identifier for retail store 12 results in display of webpage 64 including links 66 to webstores 55, 57, and 59 associated the supplier sources 54, 56, and 58, respectively. Additionally, or alternatively, links 68 to categories of products, content or services are provided, wherein each of these links references a page on one of the websites of the supplier sources. In this manner, purchases that are then made at one of the websites of the supplier source is attributed to the portal site 60 and, in particular, to a specific retail store identified by the purchaser. In this way, purchases at the websites 60 of the supplier sources result in a commission allocation to retail store 12. Retail store 12 may have its own website 13 and can serve as, and perform the functions of, the portal site 60.

In an alternate embodiment of the invention (not shown), retail store 12 may have a website. The retail store website then provides a link to supplier source 14 (and other sources with similar affiliate relationships), such that purchaser 22 is directed to the website of the retail store and then given the opportunity to link to a supplier source to make additional purchases. Per an affiliate agreement, purchases made at the supplier source website 18 result in a commission allocation back to retail store 12. Such an embodiment may require entry of an identifier or coupon code, provided to purchaser in the manner(s) described above, at the retail store website and/or at the supplier source website 18.

From the foregoing, it will be seen that the present invention provides a very unique manner of affiliate marketing. In addition to the examples provided above, it will be seen that a wide variety of business could employ such a marketing technique, even in cases in which one party is not a supplier to the other party. For example, and assuming for this example that Amazon.com, a well-known Internet retailer, does not supply products to Starbuck's coffee shops (a well-known coffee shop chain). Amazon.com could run a promotion with Starbucks coffee chain in which a coupon code is presented on Starbuck's coffee cups. Purchasers of a Starbuck's coffee could access Amazon.com and enter the coupon code and make a purchase. The coupon code may or may not entitle the purchaser to a discount on the purchase made at Amazon.com, but a purchase would qualify Starbucks for a commission. Such a program could be limited to a specific product or category of products; for example, a coffee cup or a book on coffee beans, or could be unlimited in terms of product scope.

It will be understood that certain features and subcombinations of the present invention are of utility and may be employed without other features or subcombinations of the present invention. This is contemplated by and is within the scope of the claims. It will be appreciated that, in any embodiment of the invention, portions of the activity at a website (such as the shopping cart function and/or the affiliate identification function and the commission allocation function) may be outsourced to a separate server, such as associated with the portal site. Since many possible embodiments may be made of the invention without departing from the scope thereof, it will be understood that all subject matter herein and in the accompanying drawings is to be interpreted as illustrative, and not limiting.

What is claimed is:

1. A method comprising:
providing a product in a retail store that has a unique identifier corresponding to the retail store and a website address located on at least one of said product and a package for said product; and
allocating a commission to the retail store for a purchase made at a website associated with the website address based upon entry at the website of the unique identifier, wherein said purchase made via said website is of an item that is first identified, by a buyer of said product, via said website from a location other than said retail store and after said product has been purchased at said retail store.

2. The method as set forth in claim 1 further comprising offering products on said website that are not offered in said retail store but that fall in a category that corresponds to said product provided in said retail store.

3. The method as set forth in claim 1 further comprising storing details of a customer who made a purchase at said website in a database record.

4. The method as set forth in claim 1 further comprising associating said customer and said retail store in said database record.

5. The method as set forth in claim 4, wherein said purchase is an initial purchase, said method further comprising allocating a commission to said retail store on a subsequent purchase at said website.

6. The method as set forth in claim 1 further comprising offering with said product a discount on said purchase made at said website.

7. The method as set forth in claim 1 wherein said providing a product in a retail store comprises providing an informational product that provides information on a subject matter, said method further comprising offering on said website an appliance related to said subject matter, wherein said purchase made at said website comprises a purchase of said appliance.

8. The method as set forth in claim 1 wherein said providing a product in a retail store comprises providing an appliance for use in a task, said method further comprising offering on said website a second product that is used with said appliance, wherein said purchase made at said website comprises a purchase of said second product.

9. A method comprising:
offering a product in a retail store that has a unique identifier corresponding to the retail store and a website address located on at least one of said product and a package for said product; and
receiving a commission for a purchase made at a website associated with the website address based up on entry at the website of the unique identifier, wherein said purchase made via said website is of an item that is first identified, by a buyer of said product, via said website from a location other than said retail store and after said product has been purchased at said retail store.

10. The method as set forth in claim 9 further comprising offering products on said website that are not offered in said retail store but that fall in a category that corresponds to said product offered in said retail store.

11. The method as set forth in claim 9 wherein said offering a product in a retail store comprises offering an informational product that provides information on a subject matter, said method further comprising offering on said website an appliance related to said subject matter, wherein said purchase made at said website comprises a purchase of said appliance.

12. The method as set forth in claim 9 wherein said offering a product in a retail store comprises providing an appliance for use in a task, said method further comprising offering on said website a second product that is used with said appliance, wherein said purchase made at said website comprises a purchase of said second product.

13. A system comprising:
a retail store associated with a first source;
a provider of goods associated with a second source, wherein a product from said second source is offered in said retail store, wherein said product has a unique identifier for identifying the first source and a website address associated with the second source located on at least one of said product and a package for said product, wherein a purchase at a website associated with said website address that includes an entry of said unique identifier results in a commission for the purchase being allocated to said first source, wherein said purchase made via said website is of an item that is first identified, by a buyer of said product, via said website from a location other than said retail store and after said product has been purchased at said retail store.

14. The system as set forth in claim 13, wherein said website offers products that are not offered in said retail store but that fall in a category that corresponds to said product offered in said retail store.

15. A system comprising:
a retail store associated with a first source;
a provider of goods associated with a second source, wherein a product from said second source is offered in said retail store, wherein said product has a unique identifier for identifying at least one of said first source and said second source and a website address associated with a third source located on at least one of said product and a package for said product, wherein a purchase at a website associated with said website address that includes an entry of said unique identifier results in a commission for the purchase being allocated to at least one of said first source and said second source, wherein said purchase made via said website is of an item that is first identified, by a buyer of said product, via said website from a location other than said retail store and after said product has been purchased at said retail store.

16. The system as set forth in claim 15, wherein a purchase at said website that includes an entry of said unique identifier further results in a commission for said first source.

17. The system as set forth in claim 15, wherein a purchase at said website that includes an entry of said unique identifier further results in a commission for said second source.

18. The system as set forth in claim 15, wherein a purchase at said website that includes an entry of said unique identifier further results in a commission for said first source and said second source.

19. The system as set forth in claim 15, wherein said website offers products that are not offered in said retail store but that fall in a category that corresponds to said product offered in said retail store.

* * * * *